United States Patent [19]
Merritt

[11] 3,908,967
[45] Sept. 30, 1975

[54] SLURRY DENSITY AVERAGING SYSTEM AND APPARATUS

[75] Inventor: Clyde H. Merritt, Corona, Calif.

[73] Assignee: Byron Jackson Inc., Long Beach, Calif.

[22] Filed: May 9, 1974

[21] Appl. No.: 468,320

[52] U.S. Cl. ............................................. 259/153
[51] Int. Cl.² ...................... B28C 5/02; B28C 5/46
[58] Field of Search ........... 259/147, 151, 148, 152, 259/153, 146, 161, 162, 168, 148, 154

[56] References Cited
UNITED STATES PATENTS

| | | | |
|---|---|---|---|
| 886,768 | 5/1908 | Bogory | 259/148 |
| 2,316,705 | 4/1943 | Morgan | 259/152 |
| 3,231,245 | 1/1966 | Harvey | 259/153 |
| 3,667,735 | 6/1972 | Hood | 259/151 |

Primary Examiner—Robert W. Jenkins
Attorney, Agent, or Firm—John O. Evans, Jr.

[57] ABSTRACT

A slurry density averaging system includes primary slurry blending apparatus and slurry density averaging apparatus connected together in a loop for recirculating a cement slurry blend and minimizing density variations in the slurry discharged from the system. The primary slurry blending apparatus includes a mixer for water and bulk cement which supplies the ingredients of the slurry to a mixing chamber through which the slurry is pumped by a primary mixing pump. The density averaging apparatus includes a tank connected with the primary mixing pump outlet and receiving the primarily mixed slurry, the averaging tank being connected with an averaging pump which recirculates the slurry through the averaging tank and effects the downstream discharge of the slurry.

15 Claims, 5 Drawing Figures

U.S. Patent Sept. 30,1975 Sheet 1 of 3 3,908,967

3,908,967

SLURRY DENSITY AVERAGING SYSTEM AND APPARATUS

BACKGROUND OF THE INVENTION

In the mixing of cement slurries on a continuous basis, such as in the case of mixing a cement slurry to be displaced into a well bore for performing cementing operations, say in the cementing of a string of casing in a well bore, density variation has long posed problems. Continuous slurry mixers adapted to be controlled by reference to a continuous densimeter have been developed which have been satisfactory for many applications, in that density variations have been reduced over the entire range of the pumpable slurry densities.

For example, mixing apparatus has been provided wherein the bulk cement material is metered through a flow control valve and initially mixed with a controlled volume of water, the preliminarily mixed slurry then being circulated through a mixing chamber before being supplied to the downstream cement pump which displaces the cement into the well. By continuously monitoring the slurry density with a densimeter and controlling the water-cement ratio, reasonable control of the density has been accomplished. However, today's prevailing conditions in the case of many well cementing operations, such as in very deep, hot wells, offshore wells, and extremely cold climates have accentuated the need for more precise cement density control.

SUMMARY OF THE INVENTION

The present invention provides a system and apparatus which is operable to mix a cement slurry and maintain minimal density variation over a wide range of mixing rates. The apparatus is very compact, and therefor easy to employ in remote locations and in locations where space is not available for the usual large scale batching tanks used in an effort to minimize density variations in the mixed slurry.

More particularly, the present invention contemplates the provision of a slurry density averaging apparatus or system adapted to be connected in communication with the output from a primary continuous slurry blender whereby the density variations in the primary blender and in the averaging system are averaged to minimize variations in the density of the slurry supplied from the overall mixing and density averaging apparatus.

In accomplishing effective slurry density averaging the system, in operation, is filled with the slurry as it is being mixed and remains full during the entire mixing operations. The discharge rate from the system is governed by the rate at which the slurry is utilized or displaced by the cementing pumps when a cementing operation is being performed on a well so that no controls for rate or slurry level within the system are necessary.

More particularly, the averaging apparatus includes a mixing tank to which pre-mixed slurry is supplied through jet nozzles arranged with respect to the tank to cause the slurry to be swirled and mixed continuously. The tank is connected for cement recirculation to the primary mixer and to supply slurry to the downstream cementing pump. In addition a fast equalizing or averaging tank is provided between the averaging tank and the premixer, whereby during filling of the system, particularly, a high rate of circulation from the averaging tank to the primary mixer results in the density of the mix in the averaging tank and in the primary mixer being equalized as indicated by densimeters in the primary mixing system and in the averaging system.

This invention possesses many other advantages, and has other purposes which may be made more clearly apparent from a consideration of the form in which it may be embodied. This form is shown in the drawings accompanying and forming part of the present specification. They will now be described in detail for the purpose of illustrating the general principals of the invention; but it is to be understood that such detailed descriptions are not to be taken in a limiting sense.

DESCRIPTION OF THE PREFERRED EMBODIMENT

Figure 1:
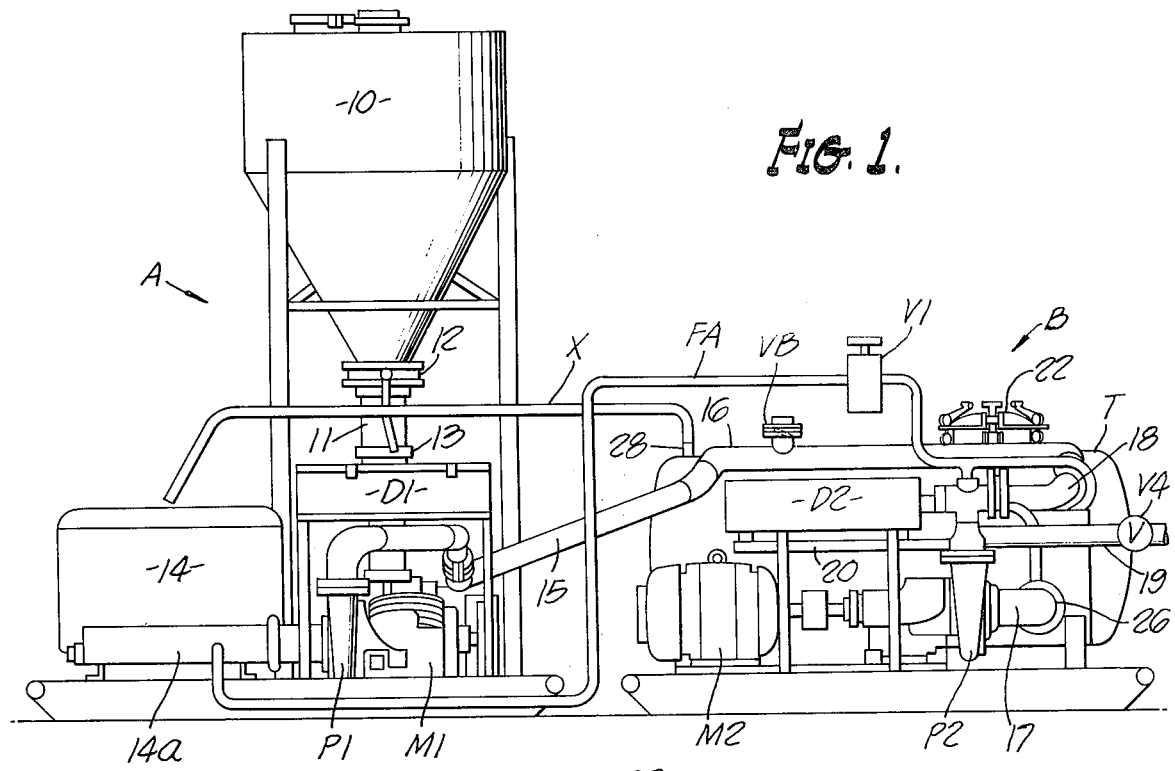
FIG. 1 is a view in side elevation, generally illustrating primary continuous mixing apparatus in conjunction with slurry density averaging apparatus made in accordance with the invention.

As seen in FIG. 1, the apparatus comprises a primary, continuous cementing slurry blending or mixing apparatus A, of a known type, combined with density averaging apparatus B in accordance with the invention. The primary mixing apparatus comprises a typical surge tank 10 adapted to receive a quantity of dry, bulk cement material and to supply the material to a preliminary mixing module 11 through a control valve 12. Water is supplied from a suitable pressure source to the preliminary mixing module 11 via a valve 13 from a source (not shown). The preliminarily mixed cement is circulated by a primary circulating pump P1, driven by a suitable motor M1, through an open-top mixing chamber 14 having an outlet conduit 14a connected with the inlet of the pump P1 and the mixed slurry is also displaced by the pump P1 from the primary mixer A via a conduit 15. A continually operating densimeter D1 is provided in the primary mixer A to monitor the density of the mixed cement slurry so that more or less water can be added to the preliminary mixer 11 so as to maintain the density of the slurry discharged through the conduit 15 at a desired density which is substantially constant. However, variations in the condition of the dry cement inherently cause density variations which must be corrected to avoid faulty oil well cementing work.

The density averaging apparatus B comprises a tank T to which the premixed slurry is supplied from the outlet conduit 15 from the primary mixer A. The tank T has a manifold or header 16 connected with the conduit 15 and from which the premixed slurry is supplied to the tank T at a plurality of spaced locations, as will be later described. Slurry from the tank is fed through a conduit 17 to a circulating or averaging pump P2 driven by a suitable motor M2, and the slurry is recirculated by the pump P2 back to the tank T via a conduit 18 which is also connected with a discharge conduit 19. The discharge conduit 19, in the usual manner, will be connected to the intake of a typical oil well cementing pump in the case that the apparatus is being used to control the density of oil well cementing slurry. In addition, the apparatus B includes a second densimeter D2 in a loop 20 with the averaging pump P2 whereby to compare the density of the slurry being circulated through the averaging tank T with the density of the slurry being mixed and circulated through the primary mixing chamber 14. Such continuously operating densimeters may be of a variety of types, an example of which is that disclosed in U.S. Pat. No. 3,541,863, granted Nov. 24, 1970, in the name of C. D. Barron, et al., for "Densimeter."

As will be later described, a fast averaging means is provided including a conduit FA having a valve V1 therein and leading from the averaging system conduit 18 to the circulating tank outlet conduit 14a and, thus, to the inlet of the primary circulating pump P1. As will also be later described, a vent line or air exhaust line X leads from the top of the tank T to the open upper end of the mixing chamber 14. To allow the tank T to be evacuated it is also provided with a vacuum breaker check valve VB.

Figure 3:
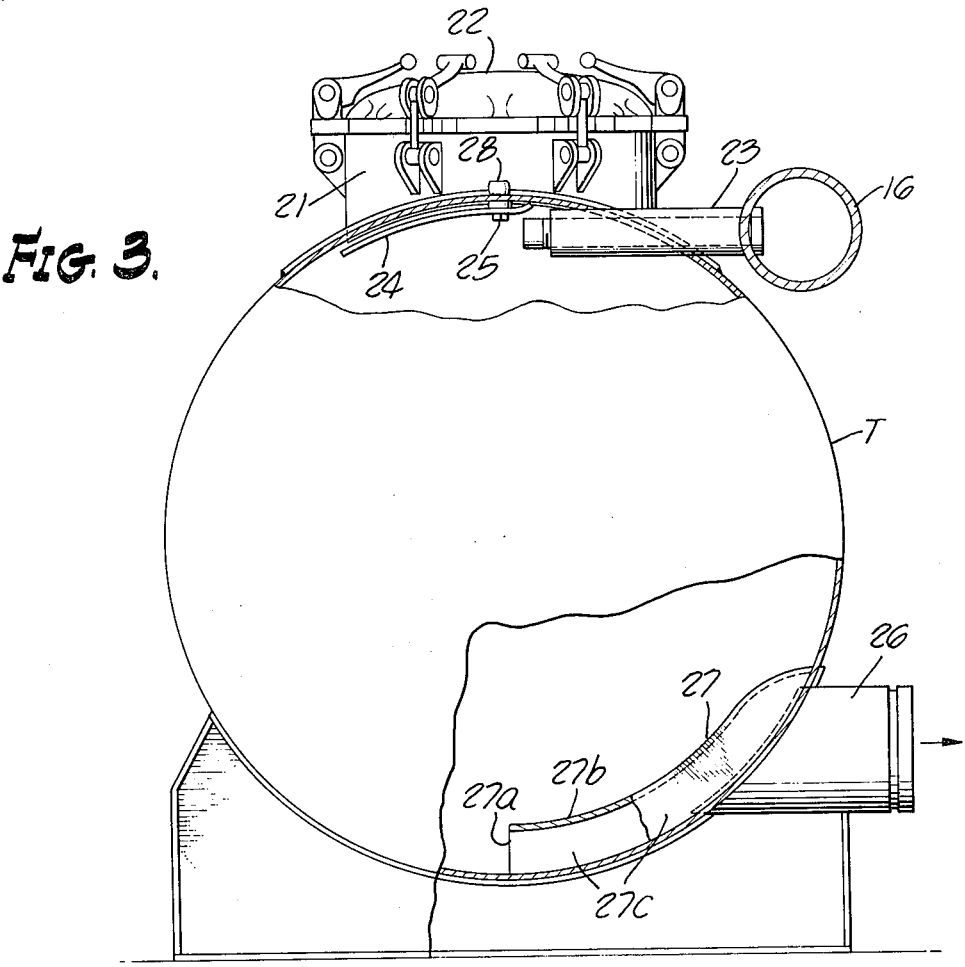
FIG. 3 is a view in end elevation with certain of the parts broken away to disclose the interior of the tank.
Figure 2:
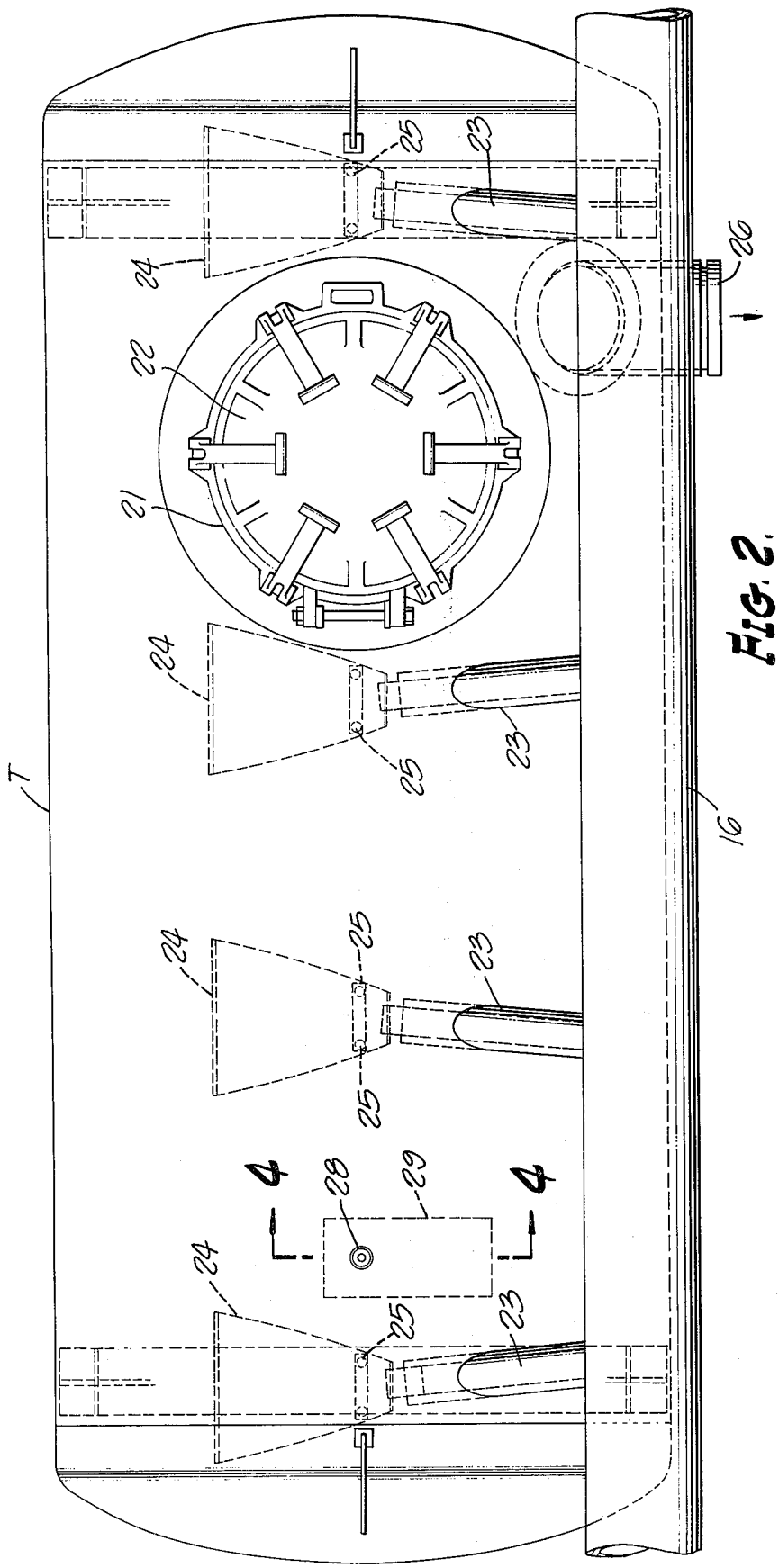
FIG. 2 is a top plan view of the density averaging tank.
Figure 4:
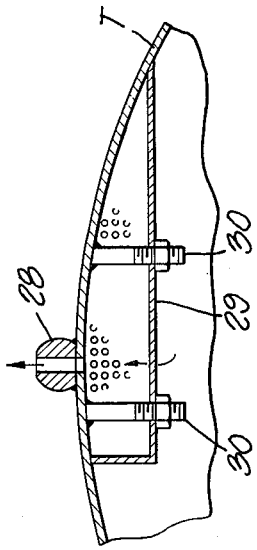
FIG. 4 is a fragmentary detail view in section, as taken on the line 4—4 of FIG. 2.

Referring to FIGS. 2 through 4, the averaging tank T of the density averaging apparatus B is shown in greater detail. The tank T may be of any suitable size to fit upon a suitable base such as a trailer or skid. In FIG. 1 both the primary mixing apparatus A and the averaging appparatus B are shown as being mounted on a suitable skid. In the illustrative form the tank is in the form of an elongated, horizontally disposed cylinder having at an appropriate location a top filler opening 21 adapted to be closed by a typical closure 22 shown as being of the cam-locked type. The manifold or header 16 previously referred to is disposed along side of the tank T and has a plurality of jet nozzles 23 spaced longitudinally of the manifold 16 and extending into the wall of the tank T, whereby slurry supplied to the manifold is jetted into the tank T at relatively high velocity. If desired or necessary the nozzles may be fitted with an orifice designed to further increase velocity of the slurry flow into the tank. The nozzles 23 are disposed so that they direct fluid tangentially into the cylindrical tank T to cause the slurry to flow circumferentially in the tank. In addition, the nozzles 23 are disposed at an angle to a transverse plane with the nozzles nearest the ends of the tank having therein outlet ends opening generally towards the ends of the tank and with the intermediate nozzles opening in convergent relation to enhance mixing of the slurry as it swirls within the tank T.

Inasmuch as the cement slurry is abrasive the interior of the tank in the path of the fluid flowing from the respective nozzles 23 is provided with a number of fan-shaped plates 24 suitably secured at 25 within the tank against which the high velocity abrasive slurry impinges to save the tank from internal wear. The tank T has an outlet 26 through which the slurry passes during operation of the system as will be later described, and within the tank is a scoop 27 constructed with an inlet 27a, an inner wall 27b which parallels the tank wall, and side walls 27c which define an outlet flow path at the bottom of the tank to enable the tank to be substantially fully evacuated without allowing air to enter the outlet and interfere with the operation of the circulating pump P2. In order to initially fill the tank it is necessary to bleed air from the tank, and accordingly, at the top of a tank is an air discharge fitting 28 connectable with the exhaust conduit X. Within the tank is a screen 29 secured by fastenings 30 at the inner wall of the tank and adapted to prevent the entry of particles into the vent 28 which otherwise might plug the opening through the fitting 28. The screen 29 is so shaped as to not substantially interfere with the flow of slurry in its swirling path by causing turbulence. Thus, the inner wall of the screen 29 is extended into contact with the arcuate tank wall on a chordal plane.

Figure 5:
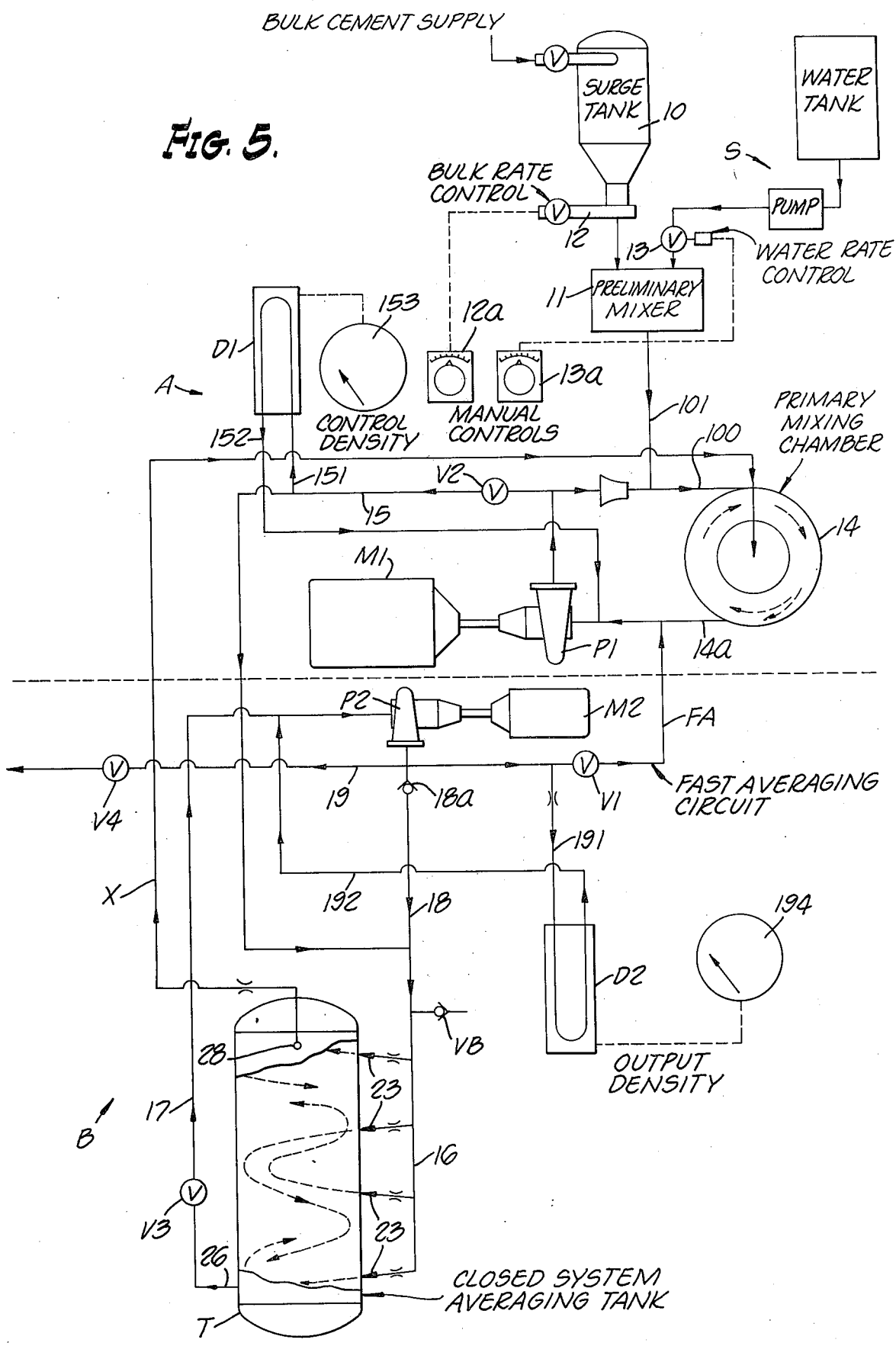
FIG. 5 is a schematic diagram showing the density averaging system in conjunction with a primary slurry mixer system.

Referring to FIG. 5, the operation of the apparatus thus far described will be best understood by reference to the schematic diagram which shows the relationship between the primary mixing means A and the density averaging means B.

The primary mixing pump P1 is seen to be connected in a conduit loop 100 including the conduit 14a which connects the discharge from the mixing chamber 14 with the inlet of the primary mixing pump. A line 101 connects the water-cement mixing module 11 with this loop 100 to supply the slurry initially under the control of the bulk rate control valve 12 and the water rate control valve 13. Normally, the bulk rate to the mixing module 11 would be established by a bulk rate valve control means 12a, and the water rate is adjusted by a water rate valve control means 13a which controls water supplied from a source S. The conduit 15 leading to the averaging tank manifold 16 is connected with the mixing loop 100 at the discharge side of the primary pump P1, and under the control of a valve V2 in the conduit 15 premixed slurry can be supplied to the header 16 and through the nozzles 23 to the tank T. The conduit 17 leading from the tank to the intake of the averaging system pump P2 has a valve V3 which remains closed until the tank T is filled with slurry to be recirculated through the averaging system, as will be later described.

The fast averaging or equalizing conduit FA will be seen to have a junction with the conduit 18 which connects the discharge of the averaging pump P2 to the averaging tank header 16. The fast averaging conduit has the valve V1 which controls flow from the averaging pump P2 to the primary mixing loop 100.

The air exhaust or bleed conduit X leads from the exhaust fitting 28 of the tank T to the open top of the mixing chamber 14, so that when the tank T is full a quantity of overflow slurry will be supplied to the mixing chamber 14 to visually indicate the full tank condition.

Densimeter D1 of the primary mixing apparatus A is in parallel with the primary mixing system and includes a junction 151 with the conduit 15, between the primary mixing pump P1 and the averaging tank T. A quantity of slurry passes through the densimeter D1 for continuous weighing of the premixed slurry and then returns to the primary mixing system by a conduit 152 which leads to the primary mixing pump P1. The density of slurry in the primary mixing system may be recorded on the chart 153 operated by the densimeter D1.

Densimeter D2 of the averaging system is in parallel with the circulating pump P2 and includes a connection 191 with the discharge side of the pump P2. A quantity of the slurry being circulated by the pump P2 passes through the densimeter D2 through the connection 191 for continuous weighing and returns by a conduit 192 to the intake side of the pump P2 along with the return conduit 17 leading from the tank T to the pump. The density of slurry in the averaging system may be recorded on the chart 194 operated by the densimeter D2. This is the density of slurry supplied to the discharge conduit 19 leading to the downstream cementing pumps and thence to the well bore.

Operation

During the initial filling of the averaging system, as well as during the continuous mixing, valve V2 is in the open position. The slurry passes through valve V2 into conduit 15 and thence to the header 16. The pressure in conduit 15 maintains the vacuum breaker checkvalve VB in the closed position preventing leakage. The header 16 is of sufficient size to provide a relatively uniform pressure feed to each of a plurality of jet nozzles 23. The slurry passes through each nozzle into the averaging tank T. During the initial filling the averaging pump P2 is not running or the discharge valve V3 is closed. This prevents excessive agitation during the initial filling and prevents mixing of the initial air volume in the tank with the slurry. As the averaging tank is being filled the initial air volume is displaced through the low-rate bleed fitting 28 and exhaust conduit X which terminates in the primary mixer chamber 14 at a location visible to the operator. When slurry appears at this terminal the averaging tank is known to be full of slurry and recirculation may be commenced by starting the averaging pump P2 or, if it is running, by opening tank discharge valve V3.

Prior to commencing continuous pumping through the output conduit 19, the densimeters D1 and D2 may indicate a density difference in the slurry within the averaging system B as compared to the slurry within the primary mixer A. The fast equalizing circuit or averaging circuit FA provides means for equalizing the density in the two systems. To accomplish this function valve V1 is opened allowing a high rate of slurry to pass through conduit FA to the primary mixer pump P1. The primary mixer pump pumps an equal rate of slurry back through the conduit 15 to the tank T. The slurry is allowed to circulate in this fashion between the primary mixer and the averaging system until the densities of the two volumes of slurry become equal. At this time the valve V1 is closed and the system is ready to commence the continuous pumping and recirculating cycle.

Prior to commencing of recirculation of slurry in the averaging system the rate of slurry passing through the jet nozzles 23 into the averaging tank T is equal to the mixing rate of the primary mixer A. Upon starting the averaging pump P2 or opening valve V3 the slurry passes through the conduit 17 and into the pump P2. The pump P2 discharges the slurry into conduits 18 and 19. The slurry rate through the tank input conduit 15 is always equal to the combined slurry rate through output conduit 17 and bleed rate through bleed conduit X provided the primary mixer is maintained full.

A high rate of recirculating slurry from the pump P2 passes through check valve 18a, conduit 18 and is supplied to the header 16. The recirculating slurry combines with the premixed slurry from conduit 15 and thereby increases the velocity through the jet nozzles 23 into the averaging tank T. The force of the slurry exiting from the nozzles into the tank is sufficient to set the entire volume of slurry within the tank into a forceful spinning motion about the longitudinal axis of the averaging tank. Further, as previously described, the nozzles are arranged to provide a cross-flow pattern and enchance the averaging of slurry within the tank.

The output flow from the averaging system is commenced merely by opening outlet valve V4 in conduit 19 and activating the downstream pump. Output rate is normally obtained by setting the speed of the downstream pump as desired and then the system is kept full by the rates of material flow at the primary mixer.

As the input and output flow is increased or decreased the recirculating flow decreases or increases respectively, since the total discharge rate from the averaging pump P2 provides the combined output and recirculating rate. This function causes a relatively constant flow through the averaging tank T regardless of mixing and pump-out rate.

To empty the averaging system air must be allowed to enter the averaging tank T to replace the exiting slurry to avoid vacuum-locking the pump P2. This air may be allowed to enter the averaging tank T through the vacuum breaker VB. In this s case the valve V2 is placed in the closed position causing a partial vacuum on the system. This partial vacuum opens the vacuum breaker VB.

In addition during this cycle valve V1 must be closed to prevent the air entering the system from mixing with the slurry. This prevents errors in density measurement and also allows the averaging tank T to be totally emptied. Baffle or scoop 27 in the tank T is arranged to force the slurry to the lowest point in the tank and to further prevent air from entering the outlet conduit 17 before the tank becomes totally empty.

The design is further enchanced by the ability to self-clean when filled with water and allowed to circulate for a short period of time. A second filling of water and circulating period provides adquate removal of any slurry residue within the system.

I claim:

1. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, wherein said means for conducting slurry from said primary mixing means to said tank includes a manifold, and jet nozzle means connected with said manifold and entering said tank, said jet nozzle means including a plurality of nozzles entering said tank at angles to one another.

2. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, wherein said means for conducting slurry from said primary mixing means to said tank includes a manifold, and jet nozzle means connected with said manifold and entering said tank, said tank being cylindrical and said jet nozzle means including a plurality of nozzles entering said tank at angles whereby the entry of slurry from said nozzles into said tank is tangential.

3. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, wherein said means for conducting slurry from said primary mixing means to said tank includes a manifold, and jet nozzle means connected with said manifold and entering said tank, said tank being cylindrical and said jet nozzle means including a plurality of nozzles entering said tank at angles whereby the entry of slurry from said nozzles into said tank is tangential, and said nozzles being at angles to one another.

4. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including continuously operable densimeter means cooperative with said primary mixing means and said density averaging means for comparing slurry density, and fast equalizing means between said primary mixing means and said density averaging means for diverting slurry from said density averaging means to said primary mixing means to equalize the density of the slurry.

5. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank.

6. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, said first and third conduit means being joined between said pump means and said tank.

7. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, said first and third conduit means being joined between said pump means and said tank, a manifold adjacent to said tank and connected to the junction of said first and second conduit means to receive slurry therefrom, and jet nozzle means connected with said manifold and said tank for conducting slurry into said tank at high velocity.

8. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, and an outlet control valve in said second conduit means.

9. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, and an outlet control valve means in said first conduit means between said primary pump means and said tank.

10. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, said first and third conduit means being joined between said pump means and said tank, and outlet conduit means connected with said third conduit means between said averaging pump means and the junction between said first and third conduit means.

11. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, said first and third conduit means being joined between said pump means and said tank, outlet conduit means connected with said third conduit means between said averaging pump means and the junction between said first and third conduit means, and outlet control valve means in said outlet conduit.

12. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, continuously operable densimeter means cooperative with said primary mixing means and said density averaging means for comparing slurry density, and fast equalizing means between said primary mixing means and said density averaging means for diverting slurry from said density averaging means to said primary mixing means to equalize the density of the slurry.

13. Cement slurry density averaging apparatus comprising, in combination, primary mixing means for mixing a slurry of bulk cement and water, and density averaging means cooperative with said primary mixing means for reducing variations in the density of said slurry, said primary mixing means including a mixing chamber, primary pump means for circulating slurry through said chamber, means for supplying slurry to said primary mixing means, said density averaging means including a closed mixing tank, means for conducting slurry from said primary mixing means to said tank, averaging pump means for circulating slurry through said tank, and means for conducting slurry from said density averaging means, including first conduit means leading from said primary pump means to said mixing chamber and to said tank, second conduit means leading from said tank to said averaging pump means, and third conduit means leading from said averaging pump means to said tank, continuously operable densimeter means cooperative with said primary mixing means and said density averaging means for comparing slurry density, and fast equalizing means between said primary mixing means and said density averaging means for diverting slurry from said density averaging means to said primary mixing means to equalize the density of the slurry, said fast equalizing means including a valved conduit leading from said third conduit means to said mixing chamber.

14. A tank for use in a slurry mixing and averaging system comprising, a closed cylindrical tank body, a plurality of jet nozzles leading into said body and disposed at angles to cause tangential entry of slurry into said tank, a manifold connected with said jet nozzles, said tank having an outlet, and means for exhausting air from said tank and slurry from said tank when said tank is full, including means providing a scoop in said tank at said outlet, said scoop including an inner wall paralleling the wall of said tank, side walls joining said inner wall to said wall of said tank, said inner wall and said side walls defining an inlet to said scoop.

15. A tank for use in a slurry mixing and averaging system comprising, a closed cylindrical tank body, a plurality of jet nozzles leading into said body and disposed at angles to cause tangential entry of slurry into said tank, a manifold connected with said jet nozzles, said tank having an outlet, and means for exhausting air from said tank and slurry from said tank when said tank is full, said tank having internal impingement plates disposed in the path of slurry exiting from said nozzles into said tank, and including means providing a scoop in said tank at said outlet, said scoop including an inner wall paralleling the wall of said tank, side walls joining said inner wall to said wall of said tank, said inner wall and said side walls defining an inlet to said scoop.

* * * * *